United States Patent
Pisczak et al.

(10) Patent No.: US 7,802,496 B2
(45) Date of Patent: Sep. 28, 2010

(54) STRIPPER FOR ROUND SHEATHED CABLE

(76) Inventors: Philip J. Pisczak, 1133 Royal Oak Dr., Chagrin Falls, OH (US) 44022; Rick Wilson, 12784 Old State Rd., Huntsburg, OH (US) 44046; Karen Wertz, 2007 King Dr., Stow, OH (US) 44224

( * ) Notice: Subject to any disclaimer, the term of this patent is extended or adjusted under 35 U.S.C. 154(b) by 0 days.

(21) Appl. No.: 12/131,684

(22) Filed: Jun. 2, 2008
(Under 37 CFR 1.47)

(65) Prior Publication Data
US 2009/0049696 A1 Feb. 26, 2009

Related U.S. Application Data

(60) Provisional application No. 60/941,267, filed on May 31, 2007.

(51) Int. Cl.
*H02G 1/12* (2006.01)
*B21F 13/00* (2006.01)

(52) U.S. Cl. ......................................... 81/9.44; 30/90.1

(58) Field of Classification Search .................. 81/9.44, 81/9.41; 30/90.1, 91.1, 91.2, 173, 175, 191, 30/193, 229; D8/52, 98
See application file for complete search history.

(56) References Cited

U.S. PATENT DOCUMENTS

| | | | | |
|---|---|---|---|---|
| 1,107,243 A | * | 8/1914 | Adams | ........................ 30/90.6 |
| 1,800,317 A | | 4/1931 | Ries et al. | |
| 2,721,383 A | * | 10/1955 | Miller | ........................ 30/91.1 |
| 2,903,064 A | * | 9/1959 | Blonder | ........................ 30/90.6 |
| 3,871,078 A | | 3/1975 | Ogle | |
| 3,947,905 A | | 4/1976 | Neff | |
| 4,009,738 A | * | 3/1977 | Baba et al. | ................... 140/149 |
| 4,028,756 A | | 6/1977 | Coutto | |

(Continued)

OTHER PUBLICATIONS

Ideal Industries, Inc. web site (http://www.idealindustries.com), NM Cable T®-Stripper Wire Stripper, Model No. 46-248; Applicant became aware of product in or about Jul. 1998.

(Continued)

*Primary Examiner*—David B Thomas
(74) *Attorney, Agent, or Firm*—Tarolli, Sundheim, Covell & Tummino LLP

(57) ABSTRACT

A plier type stripper tool is provide for stripping sheathed cable of the type having a three spaced insulated power conducting wires, a ground wire disposed among the insulated wires and a sheath surrounding the wires. In one embodiment, the stripper tool includes a pair of levers having jaw, boss and handle portions. The stripper tool may further include a pivot joining the boss portions to enable relative movement of the levers about the pivot between open and closed portions. The jaw portions each have blade sections for coactively circumferentially cutting a cable sheath when the levers are moved from the open to the closed position. Each blade section has a set of three aligned cutting parts of a cutting edge, including a first cutting part disposed at an acute angle with respect to a longitudinal axis of the tool, a second cutting part disposed at an acute angle with respect to the longitudinal axis of the tool, and an arcuate cutting part disposed between the first cutting part and the second cutting part.

7 Claims, 7 Drawing Sheets

U.S. PATENT DOCUMENTS

| | | | |
|---|---|---|---|
| 4,083,105 A | | 4/1978 | ViPond |
| 4,229,849 A | | 10/1980 | Theiler, Sr. |
| 4,577,405 A | * | 3/1986 | Butler .................. 30/90.1 |
| 4,972,582 A | * | 11/1990 | Butler .................. 30/90.1 |
| 5,323,502 A | | 6/1994 | Miller |
| 5,638,602 A | * | 6/1997 | Wilhelm .................. 30/254 |
| 5,669,132 A | | 9/1997 | Brimmer |
| 5,711,182 A | | 1/1998 | Yang |
| 5,724,688 A | | 3/1998 | Chen |
| 5,732,471 A | | 3/1998 | Korinek et al. |
| 5,826,338 A | | 10/1998 | Chilton et al. |
| 5,924,200 A | * | 7/1999 | College .................. 30/90.1 |
| 6,012,357 A | | 1/2000 | John |
| 6,094,821 A | * | 8/2000 | College et al. .................. 30/90.1 |
| 6,588,039 B1 | | 7/2003 | Bates |
| 6,691,403 B1 | | 2/2004 | Murg |

OTHER PUBLICATIONS

Ideal Industries, Inc. web site (http://www.idealindustries.com) NM Cable T®-Stripper Wire Stripper, Model No. 46-249; Applicant became aware of product in or about Jul. 1998.

* cited by examiner

STRIPPER FOR ROUND SHEATHED CABLE

CROSS REFERENCE TO RELATED APPLICATIONS

This application claims the benefit of priority of U.S. Provisional Application No. 60/941,267, filed on May 31, 2007.

FIELD OF INVENTION

The present application relates to a stripper tool. In particular, the application relates to a stripper tool configured to strip an outer sheath from round, sheathed cable.

BACKGROUND

Brimmer, in U.S. Pat. No. 5,669,132, discloses a stripper tool configured to strip the outer sheath from a sheathed electrical cable having a pair of spaced-apart, insulated power conducting wires and a bare ground wire located therebetween inside the sheath (sometimes referred to as "NM/2 cable" or "flat sheathed cable"). However, the Brimmer tool is not configured to strip the outer sheath from a sheathed electrical cable having three insulated power conducting wires and a bare ground wire (sometimes referred to as "NM/3 cable" or "round sheathed cable").

Murg, in U.S. Pat. No. 6,691,403, discloses a stripper tool for stripping the outer sheath from a NM/2 cable. The Murg tool, however, is not configured to strip the outer sheath from NM/3 cable.

BRIEF DESCRIPTION OF THE DRAWINGS

The accompanying drawings, together with the detailed description provided below, describe exemplary embodiments of the claimed invention. Like elements are identified with the same reference numerals. The drawings are not to scale and the proportion of certain elements may be exaggerated for the purpose of illustration.

DETAILED DESCRIPTION

Figure 1:
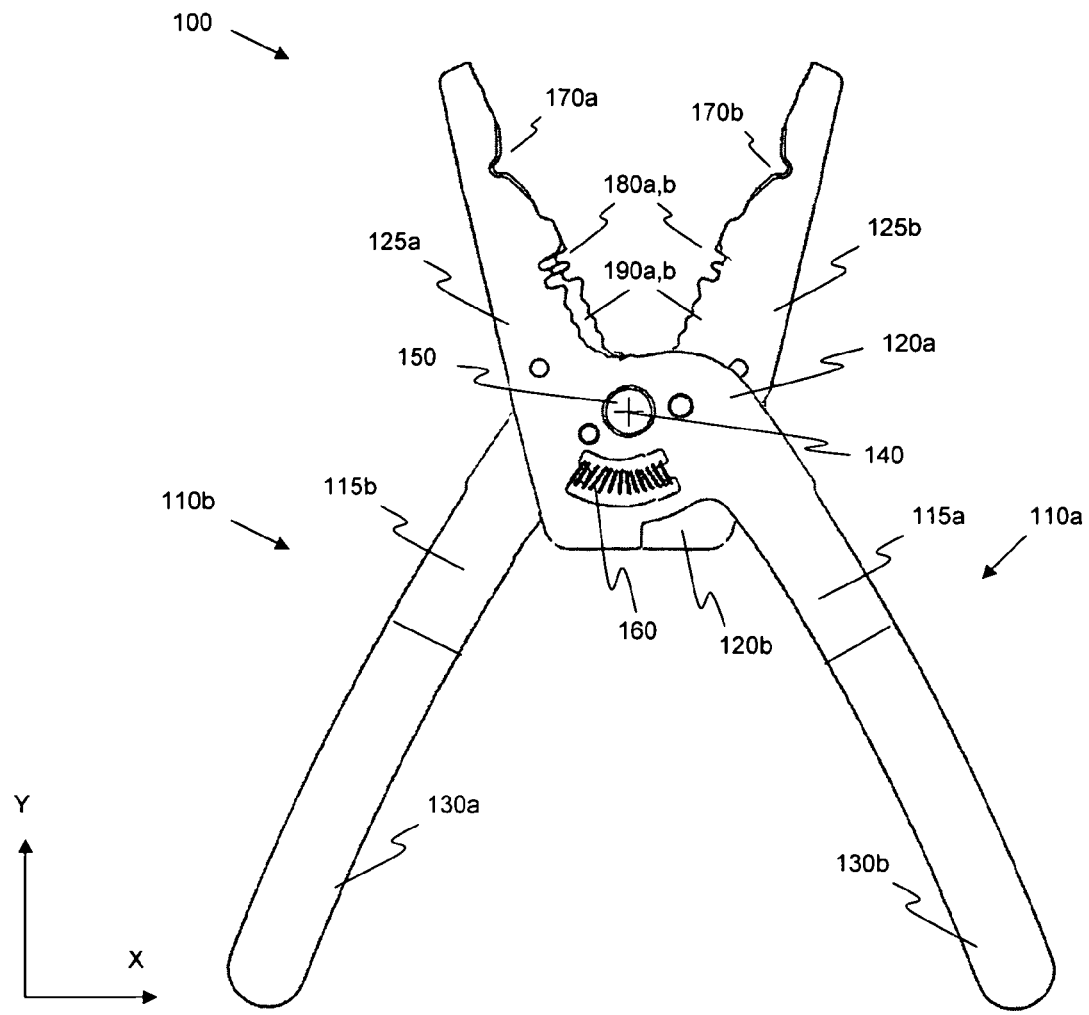
FIG. 1 is a front view of one embodiment of a stripper tool 100 in an open position.
Figure 2:
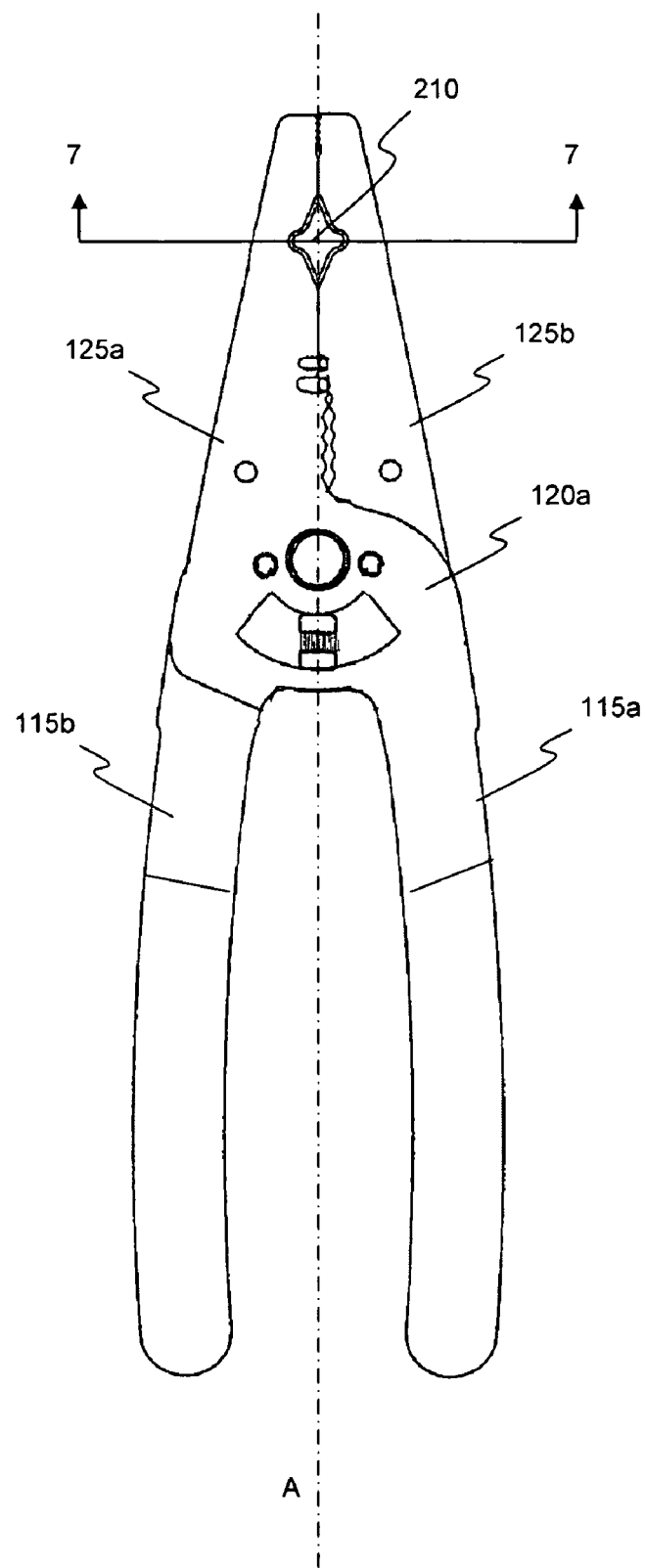
FIG. 2 is a front view of one embodiment of the stripper tool 100 in a closed position.

Certain terminology will be used in the foregoing description for convenience in reference only and will not be limiting. While it should be understood that a stripper tool may be oriented in any direction, the terms "top" and "bottom" will refer to the directions corresponding to the top and bottom, respectively, when the stripper tool is oriented as shown in FIGS. 1 and 2. Similarly, the terms "upward" will refer to the direction corresponding to the positive Y-direction, according to the X-Y axis shown in FIG. 1, and "downward" will refer to the direction corresponding to the negative Y-direction, according to the X-Y axis shown in FIG. 1.

Additionally, the verb "cut" will include the act of completely severing (i.e., cutting through the entire thickness and circumference of a sheath), but will also include the act of partially severing (i.e., cutting through the entire thickness of a sheath, but not around the entire circumference), and the act of scoring (i e., cutting partially through the thickness of a sheath, around all or part of the circumference of the sheath).

All foregoing terms mentioned above include the normal derivative and equivalents thereof.

FIGS. 1 and 2 illustrate front views of one embodiment of a stripper tool 100 in open and closed positions, respectively, adapted to cut and remove an outer sheath from a non-metallic sheathed cable. Specifically, the stripper tool 100 is configured to cut and remove an outer sheath from an NM/3 cable, commonly referred to as ROMEX™-type cable, having three power conducting wires and a bare ground wire.

Figure 3:
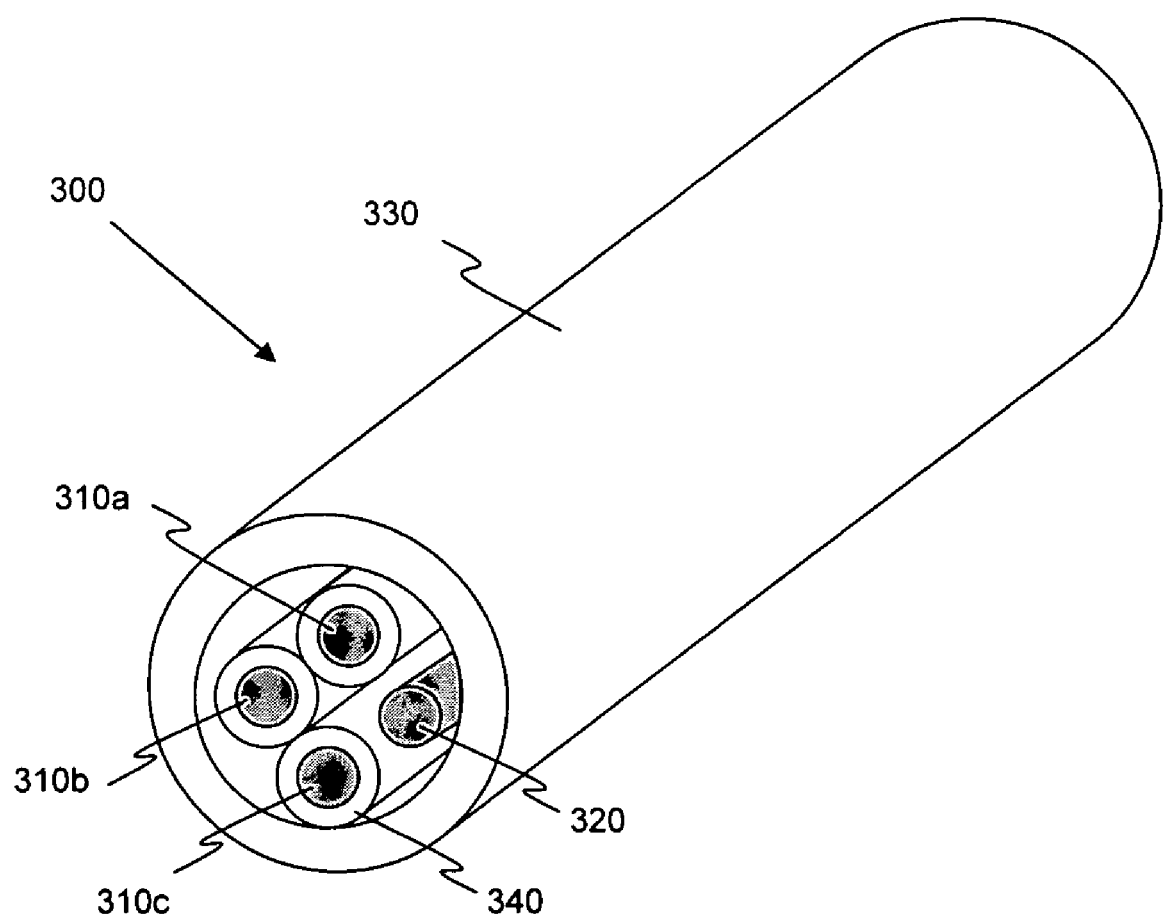
FIG. 3 is a perspective view of an exemplary round sheathed cable 300.

FIG. 3 illustrates an exemplary round sheathed cable 300. The cable 300 includes first, second, and third power conducting wires 310a,b,c and a ground wire 320 enclosed within a non-metallic sheath 330. As will be described below, the various embodiments of stripper tools disclosed in the present application are configured to strip the sheath 330 from the cable 300 illustrated in FIG. 3. However, it should be understood that the stripper tools disclosed herein may be used to strip a sheath from a cable having two or fewer power conducting wires, as well as a cable having four or more power conducting wires. Similarly, the stripper tools disclosed herein may be used to strip a sheath from a cable containing bare power conducting wires. Further, it should be understood that the stripper tools disclosed herein may be used to strip a sheath from cables having no ground wire.

With continued reference FIG. 3, each of the first, second, and third power conducting wires 310a,b,c includes an insulation covering 340. The insulation covering 340 insulates the power conducting wires 310a,b,c and prevents electrical shorts and accidental electric shock. Some cables (not shown) may further include packing to keep the power conducting wires 310a,b,c and the ground wire 320 spaced apart.

With continued reference to FIG. 3, the power conducting wires 310a,b,c and the ground wire 320 are arranged within the sheath 330 to form a substantially square or diamond shape. It should be understood that the power conducting wires 310a,b,c and the ground wire 320 may be twisted along the length of the cable 300. In the illustrated example, the sheath 330 has a substantially circular cross section. The sheath may also have a square, diamond-shaped, oval, ellipse, or generally circular cross-section. The sheath 330 may be constructed of pliable plastic, such as PVC, that may be cut by a blade.

Returning now to FIG. 1, the illustrated stripper tool 100 has a first lever member 110a and a second lever member 110b that attach to each other to form a pair of pliers. The first lever member 110a includes a first handle 115a, a first boss 120a, and a first jaw 125a. Similarly, the second lever member 110b includes a second handle 115b, a second boss 120b and a second jaw 125b. In one embodiment, insulated covers 130a,b are provided on the first and second handles 115a,b. In the illustrated embodiment, the first and second lever members 110a,b are identical except for oppositely oriented cutting edges, as will be described in further detail below. In an alternative embodiment (not shown), the first lever member 110a and the second lever member 110b are formed differently so as to fit comfortably in the contours of a user's hand.

In the illustrated embodiment, the first boss 120a and second boss 120b are joined together at a pivot point 140 by a fastener 150, thereby forming a pivotal connection. Exemplary fasteners include bolts, screws, pins, and rivets. The pivotal connection enables the first and second lever members 110a,b to pivot about pivot point 140 of the tool 100 with respect to each other between the open and closed positions. The first and second handles 115a,b and the first and second jaws 125a,b extend outward from the pivot point 140. The first and second lever members 110a,b are connected in a conventional plier arrangement such that the second handle 115b is spaced in front of and parallel to the first handle 115a.

In the illustrated embodiment, the first and second lever members 110a,b are biased to an open position by a biasing member 160. Exemplary biasing members include coil springs, wire springs, and rubber stoppers.

In one embodiment, the first and second jaws 125a,b are constructed of metal and further include first and second blade sections 170a,b. As will be described in further detail below, the first and second blade sections 170a,b are configured to strip a sheath 330 from a cable 300. In the illustrated embodiment, the first and second jaws 125a,b further include a first and second pair of recesses 180a,b configured to strip insulation coverings 340 from power conducting wires 310a,b,c. Further, first and second jaws 125a,b include first and second supplementary cutting sections 190a,b configured to sever a cable 300.

FIG. 2 illustrates the stripper tool 100 in a closed position. When the stripper tool 100 is in a closed position, it has a longitudinal axis A, as shown. In one embodiment, the stripper tool 100 may be locked in a closed position by a locking mechanism (not shown). When the handles 115a,b are moved together, the jaws 125a,b move together in a corresponding fashion, into a closed position. As will be described in further detail below, when the stripper tool 100 is in the closed position, the first and second blade sections 170a,b form a cable receiving opening 210.

Figure 4:
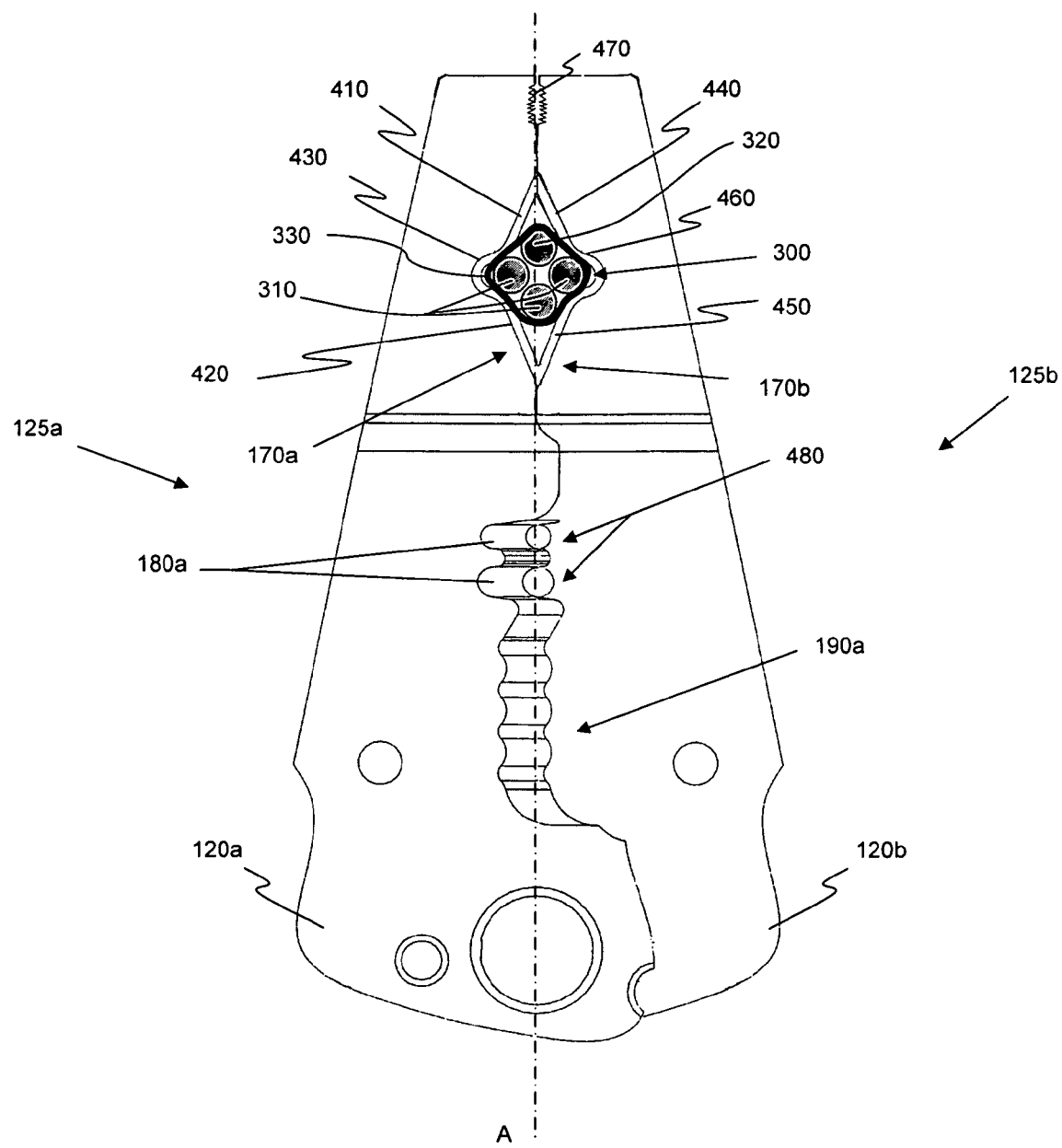
FIG. 4 is a close-up front view of first and second jaws of the stripper tool 100 in a closed position.

FIG. 4 illustrates a close-up front view of the first and second jaws 125a,b of one embodiment of a stripper tool. As can be seen in the illustrated embodiment, the first blade section 170a of the first jaw 125a is a continuous cutting surface that includes a first cutting portion 410 disposed at an acute angle with respect to a longitudinal axis A of the tool 100, when the tool 100 is in a closed position. In the illustrated embodiment, the first cutting portion 410 is a straight portion. In an alternative embodiment (not shown), the first cutting portion 410 is a curved portion.

The first blade section 170a further includes a second cutting portion 420 disposed at an acute angle with respect to the longitudinal axis A of the tool 100, when the tool 100 is in a closed position. In the illustrated embodiment, the second cutting portion 420 is a straight portion. In an alternative embodiment (not shown), the second cutting portion 420 is a curved portion.

Finally, the first blade section 170a also includes a third cutting portion 430 disposed between the first cutting portion 410 and the second cutting portion 420. In the illustrated embodiment, the third cutting portion 430 is an arcuate portion. In an alternative embodiment (not shown), the third cutting portion 430 is an angled portion.

Similarly, the second blade section 170b of the second jaw 125b includes a fourth cutting portion 440 disposed at an acute angle with respect to a longitudinal axis A of the tool 100, when the tool 100 is in a closed position. In the illustrated embodiment, the fourth cutting portion 440 is a straight portion. In an alternative embodiment (not shown), the fourth cutting portion 440 is a curved portion.

The second blade section 170b further includes a fifth cutting portion 450 disposed at an acute angle with respect to the longitudinal axis A of the tool 100, when the tool 100 is in a closed position. In the illustrated embodiment, the fifth cutting portion 450 is a straight portion. In an alternative embodiment (not shown), the fifth cutting portion 450 is a curved portion.

Finally, the second blade section 170b also includes a sixth cutting portion 460 disposed between the fourth cutting portion 440 and the fifth cutting portion 450. In the illustrated embodiment, the sixth cutting portion 460 is an arcuate portion. In an alternative embodiment (not shown), the sixth cutting portion 460 is an angled portion.

With continued reference to FIG. 4, the first and second cutting portions 410, 420 are diverging cutting portions separated by an arcuate cutting portion (the third cutting portion 430). In the illustrated embodiment, the first cutting portion 410 is disposed at an angle of approximately 22 degrees with respect to the longitudinal axis A, when the tool 100 is in a closed position. In alternative embodiments, the first cutting portion 410 is disposed at an angle between about 15 degrees to about 30 degrees with respect to the longitudinal axis. In one embodiment, the second cutting portion 420 is disposed at an angle of approximately 22 degrees with respect to the longitudinal axis A, when the tool 100 is in a closed position. In alternative embodiments, the second cutting portion 420 is disposed at an angle between about 15 degrees to about 30 degrees with respect to the longitudinal axis. In one embodiment, the first blade section 170a is horizontally symmetric.

Similarly, the fourth and fifth cutting portions 440, 450 are diverging cutting portions separated by an arcuate cutting portion (the sixth cutting portion 460). In the illustrated embodiment, the fourth cutting portion 440 is disposed at an angle of approximately 22 degrees with respect to the longitudinal axis A, when the tool 100 is in a closed position. In alternative embodiments, the fourth cutting portion 440 is disposed at an angle between about 15 degrees to about 30 degrees with respect to the longitudinal axis. In one embodiment, the fifth cutting portion 450 is disposed at an angle of approximately 22 degrees with respect to the longitudinal axis A, when the tool 100 is in a closed position. In alternative embodiments, the fifth cutting portion 450 is disposed at an angle between about 15 degrees to about 30 degrees with respect to the longitudinal axis. In one embodiment, the second blade section 170b is horizontally symmetric.

When the jaw portions 125a,b are in the closed position, as shown in the illustrated embodiment, the six cutting portions 410-460 form the cable receiving opening 210. In the illustrated embodiment, the cable receiving opening 210 is symmetric about the longitudinal axis A of the stripper tool 100, when the tool 100 is in a closed position. In the illustrated embodiment, the cable receiving opening 210 may be described as substantially diamond shaped, having a pair of opposing angles and a pair of arcuate elbows.

The shape of the cable receiving opening 210 is such that when the first and second blade portions 170a,b are closed around a cable 300 and a user applies moderate pressure, the blade portions 170a,b will bias the power conducting wires 310 and the ground wire 320 in an approximately square or diamond shape. As shown in the illustrated embodiment, the sheath 330 of the cable 300 also is formed into a diamond shape conforming to the position of the wires 310,320. In the illustrated embodiment, the cable receiving opening 210 is sized to score or partially sever the sheath 330 of the cable 300, but not to completely sever the sheath 330.

In the illustrated embodiment, the top of the first and second jaws 125*a,b* include gripper portions 470, such that the top of the stripper tool 100 forms a conventional plier nose configuration. The gripper portions enable the tool 100 to be used to twist wires (not shown). In an alternative embodiment (not shown), the top ends of the jaws 125*a,b* are curved toward the inside surface of the stripper tool 100.

With continued reference to FIG. 4, when the stripper tool 100 is in the closed position, the first and second pair of recesses 180*a,b* are positioned to form a plurality of wire receiving openings 480. In one embodiment, the plurality of wire receiving openings 480 are similar to conventional wire strippers that strip individually covered wires, conventional wire loop holes to twist wire 270°, and screw/bolt cutters. The first and second pair of recesses 180*a,b* allow a variety of sized wires to be stripped, twisted and bolts/screws to be cut.

In the illustrated embodiment, the first and second supplementary cutting sections 190*a,b* are configured to overlap, similar to a pair of scissor blades, when the stripper tool 100 is in a closed position. The first and second supplementary cutting sections 190*a,b* are therefore configured to cut a cable. In the illustrated embodiment, the first and second supplementary cutting sections 190*a,b* have a serrated half-moon configuration. In an alternative embodiment (not shown), the first and second supplementary cutting sections 190*a,b* have a straight half-moon configuration. In another alternative embodiment (not shown), the first and second supplementary cutting sections 190*a,b* have a staggered configuration, such as the cutting sections described in U.S. Pat. No. 6,588,039, incorporated herein by reference.

Figure 5A:
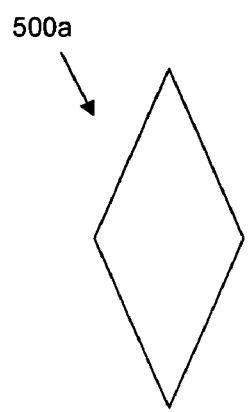
FIG. 5A-C are alternative embodiments of cable receiving openings formed by first and second jaws of a stripper tool.
Figure 5B:
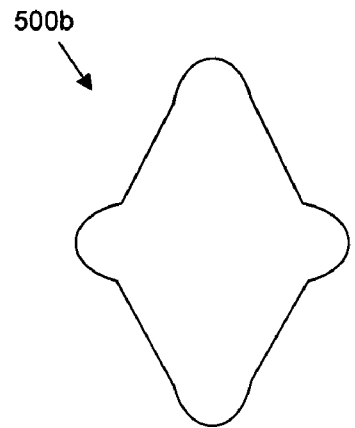
Figure 5C:
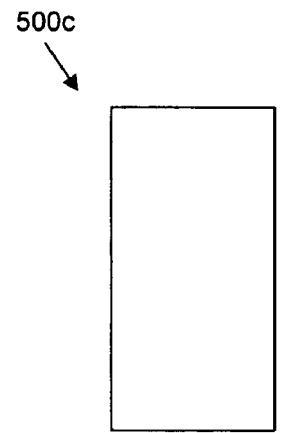

FIGS. 5A-C illustrate alternative embodiments of cable receiving openings. FIG. 5A illustrates a diamond-shaped opening 500*a* having a pair of opposing acute angles, and a pair of opposing obtuse angles. FIG. 5B illustrates a rounded, diamond-shaped opening 500*b* having four arcuate elbows. FIG. 5C illustrates a rectangular opening 500*c*. In other alternative embodiments (not shown), the cable receiving opening 310 may have other shapes, including a square or even an asymmetric shape.

Figure 6:
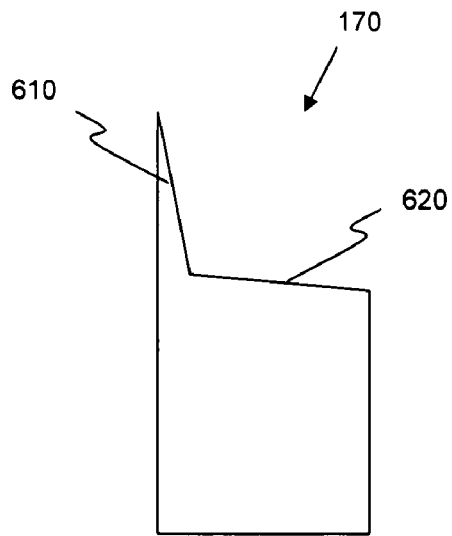
FIG. 6 is a cross-section of one embodiment of a blade section of the stripper tool 100.

FIG. 6 illustrates a cross section of a blade section 170. In the illustrated embodiment, the blade section 170 includes a cutting edge (or knife blade) 610 and a flat portion 620 substantially orthogonal to the cutting edge 610. In alternative embodiments (not shown) the cutting edge is disposed at an angle of between about 70° to about 110° with respect to the flat portion 620.

The cutting edge 610 is configured to cut the sheath 330 of the cable 300 and the flat portion 620 is configured to guide the cable 300, and acts as a cam when the stripper tool 100 is rotated with respect to the cable 300.

Figure 7:
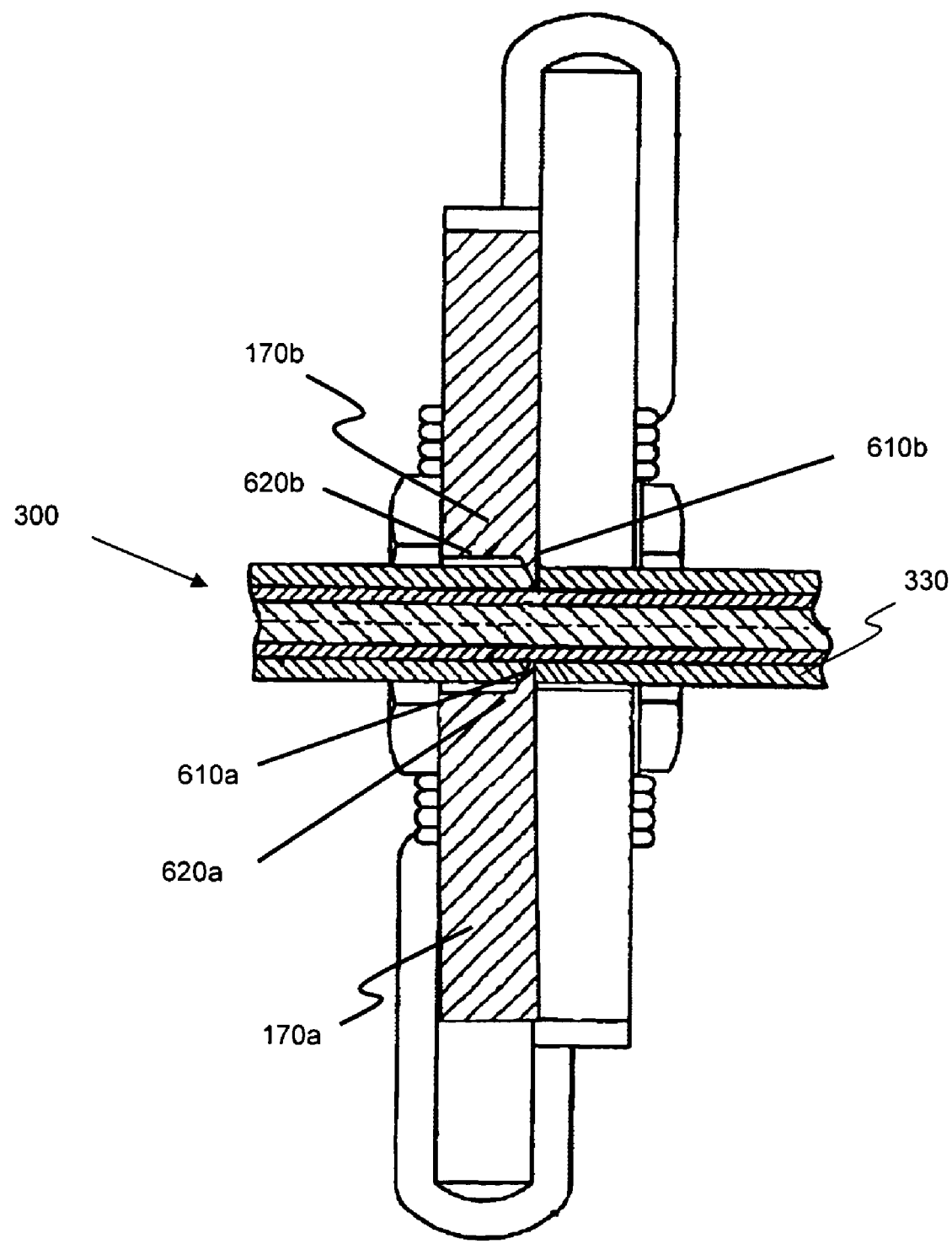
FIG. 7 is a cross-sectional view of FIG. 2 along the line 7-7 showing the knife blades of the cutting edges of the stripper tool 100 extending through the outer sheath of the cable 300.

FIG. 7 illustrates a cross-sectional view of FIG. 2 along the line 7-7. The cable 300 having a sheath 330 is also illustrated. In the illustrated embodiment, the first blade portion 170*a* includes a cutting edge (or knife blade) 610*a* and a flat portion 620*a* substantially orthogonal to the cutting edge 610*a*. Similarly, the second blade portion 170*b* includes a cutting edge (or knife blade) 610*b* and a flat portion 620*b* substantially orthogonal to the cutting edge 610*b*.

With reference now to FIGS. 1, 2, 4, 7, and 8, when the first and second blade portions 170*a,b* are close around a cable 300, and a user applies a moderate amount of pressure, the blade portions 170*a,b* will bias the power conducting wires 310*a,b,c* and the ground wire 320 in an approximately square or diamond shape such that opposing wires are aligned with the arcuate elbows of the cable receiving opening 210.

The third and sixth cutting edges 430,460 (i.e., the first and second arcuate elbows) cut, or bite into, the sheath 330 of two opposing corners of the cable 300. The first third and sixth cutting edges 430,460 cut the sheath 330 when the user applies moderate pressure to the handles.

Figure 8:
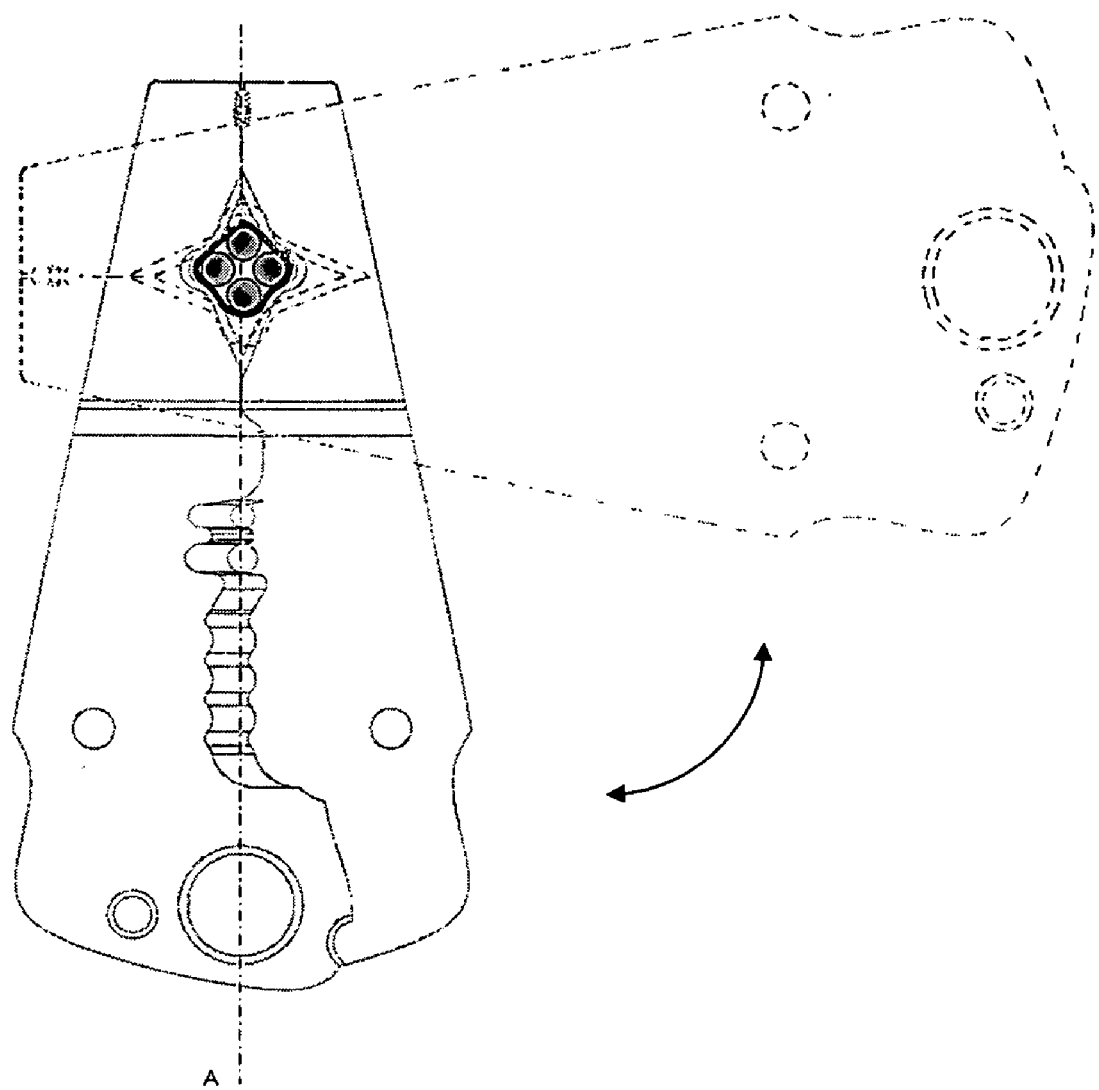
FIG. 8 is a close-up front view of first and second jaws of the stripper tool 100 in a closed position, being rotated approximately 90 degrees.

As illustrated in FIG. 8, the user then rotates the stripper tool 100 approximately 90 degrees about the cable 300 while maintaining the moderate pressure. The cutting edges 410-460 of the blade portions 170*a,b* continue to cut the sheath 330. The flat portions 620*a,b* of the blade portions 170*a,b* act as a cam during the rotation, allowing the cutting edges 610*a,b* to pierce the sheath around the entire perimeter of the cable. In one embodiment, the entire circumference of the sheath 330 is completely severed when the stripper tool 100 is rotated. In an alternative embodiment, portions of the sheath 330 remain intact. In such instances, a longitudinal back-and-forth movement of the tool 100 may be required to fully separate the sheath 330 at the desired location.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A plier-type stripper tool for sheathed cable of the type having three spaced insulated power conducting wires, a ground wire disposed among the insulated power conducting wires and a sheath surrounding the wires, the stripper tool comprising:

a pair of members, each member having a jaw portion, a boss portion, and a handle portion;

a pivot joining each of the boss portions to enable relative movement of the members about the pivot between open and closed positions;

each jaw portion having blade sections for cutting a cable sheath when the members are moved from the open position to the closed position;

each blade section having a set of three cutting edges, including a first straight cutting edge disposed at an acute angle with respect to a longitudinal axis of the tool when the tool is in a closed position, a second straight cutting edge disposed at an acute angle with respect to the longitudinal axis of the tool when the tool is in a closed position, and an arcuate cutting edge disposed between the first straight cutting edge and the second straight cutting edge; and the cutting edges together forming a cable receiving opening when the members are in the closed position, the cable receiving opening being configured to cut portions of the sheath when the members are moved from the open to the closed position and the stripper tool is turned through a 90 degree rotation.

2. The plier-type stripper tool of claim 1, wherein the cable receiving opening is configured such that the arcuate cutting edges of the blade sections cut opposing corners of the sheath of the cable when the members are moved from the open to the closed position.

3. The plier-type stripper tool of claim 1, wherein each cutting edge is adjacent to a flat portion substantially orthogonal to the cutting edge.

4. The plier-type stripper tool of claim 3, wherein the flat portions are configured to act as a cam when the stripper tool is turned through a 90 degree rotation.

5. The plier-type stripper tool of claim 1, wherein the jaw portions and the handle portions are in parallel planes.

6. The plier-type stripper tool of claim 1, wherein multiple additional cutting edges are provided on the jaw portions defining second openings for removal of the insulation around wires.

7. The plier-type stripper tool of claim 1, wherein the first straight cutting edge is disposed at an angle of between 15 degrees to 30 degrees with respect to the longitudinal axis of the tool, and the second straight cutting edge is disposed at an angle of between 15 degrees to 30 degrees with respect to the longitudinal axis of the tool.

* * * * *